June 8, 1943.  W. E. BELCHER  2,321,273
SPEED RECORDING DEVICE
Filed Aug. 12, 1939  2 Sheets-Sheet 1
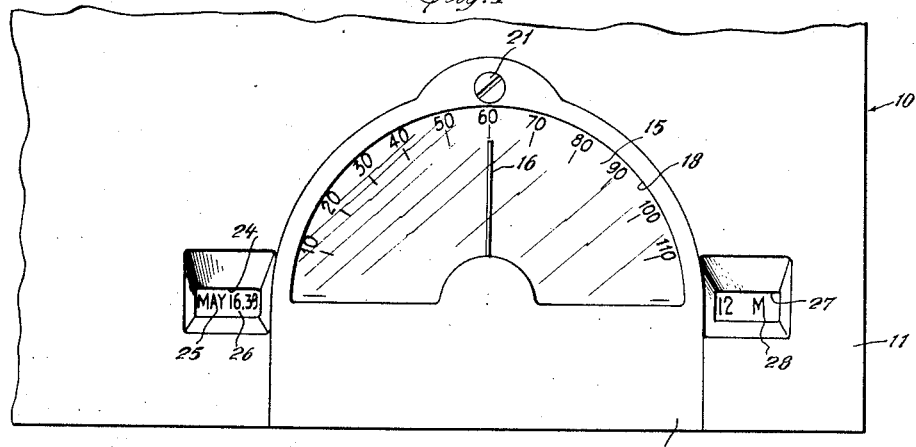
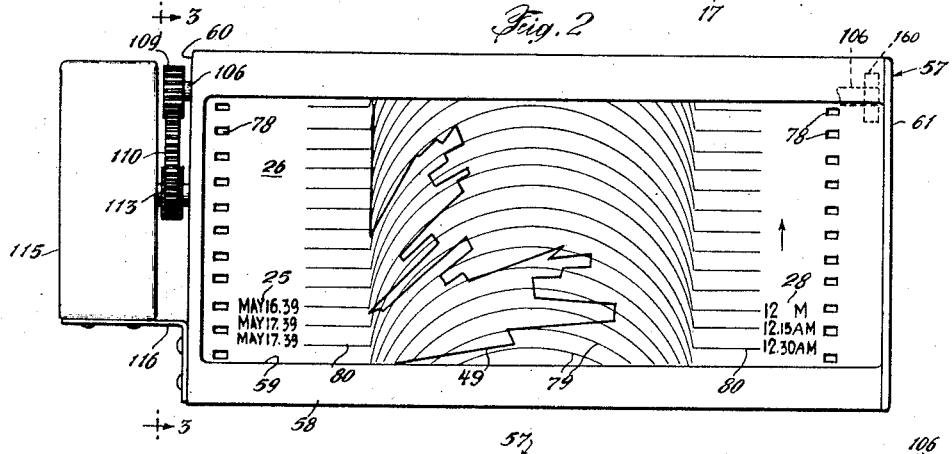
INVENTOR
WILLIAM E. BELCHER
BY John P. Claude
ATTORNEY June 8, 1943. W. E. BELCHER 2,321,273
SPEED RECORDING DEVICE
Filed Aug. 12, 1939 2 Sheets-Sheet 2

INVENTOR
WILLIAM E. BELCHER
BY John P. Chandler
his ATTORNEY

Patented June 8, 1943

2,321,273

UNITED STATES PATENT OFFICE 2,321,273

SPEED RECORDING DEVICE

William E. Belcher, Mathias, W. Va.

Application August 12, 1939, Serial No. 289,837

1 Claim. (Cl. 242—55)

This invention relates to new and useful improvements in speed recording devices and relates more specifically to an improved recording instrument adapted to be operated in association with the running gear of a vehicle and which will make a graphic and permanent record of all movement of the vehicle and the speed of such movement and will record as well the periods during which the vehicle is at rest.

The instrument which is the subject matter of the present invention is adapted particularly for use on automobiles, trucks and the like, although it is by no means limited to such use. An important object of the invention is the provision of an improved recording apparatus which will accurately and efficiently record the many speeds at which a vehicle travels over a given period and will record as well the times of such speed and the periods when the vehicle is standing still.

The particular improvement constituting the present invention resides in the provision of novel means for imparting rotation to the rewind reel for removing slack in the tape as the same is positively driven by a sprocket wheel or other convenient driving means.

In the drawings:

Fig. 1 is a broken front elevation of the preferred embodiment of the present invention;

Fig. 2 is a front elevation of the internal housing after the same has been removed from the casing, the view showing the recording tape in operative position;

Fig. 3 is an end elevation of the housing with the spring driven clock removed;

Fig. 6 is a broken end elevation partially in section of a part of the device.

Figure 4:
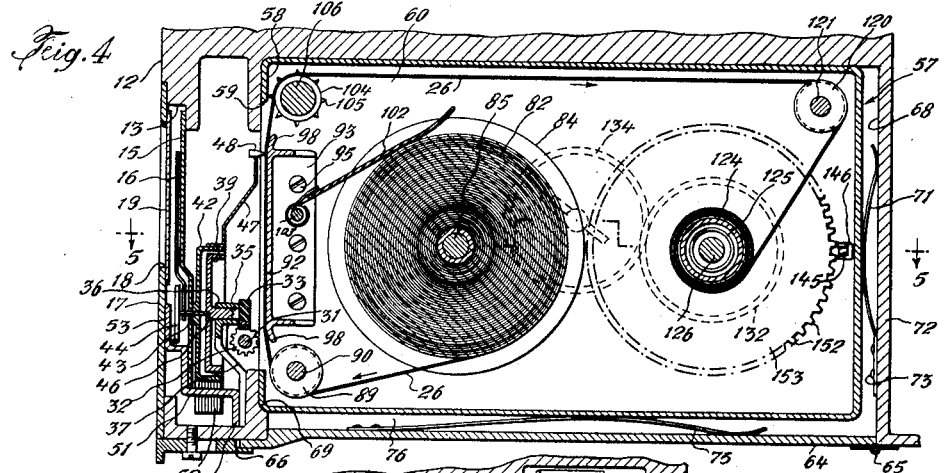
Fig. 4 is a broken vertical section taken substantially through the center of the device.

A commercially practical embodiment of the present invention is illustrated in the drawings, such device comprising a casing 10, the front surface 11 of which is provided with a substantially semicircular raised portion 12 having an opening 13 therein through which a speed indicating dial 15 and an indicating hand 16 may be observed.

This opening is covered by means of a closure plate 17 having an opening 18 therein, and a piece of transparent material 19 is secured to the rear surface of this plate adjacent to the marginal edges of the opening. The closure plate is secured to the front edge of the raised portion 12 by means of a screw 21.

To the left of the raised portion 12, when viewed from the position shown in Fig. 1, a small sight opening 24 is formed, through which the date of the month 25 may be observed on the tape 26. To the right of the raised portion another and similar small sight opening 27 is formed to permit the user to observe the time of day indicated at 28.

The preferred embodiment of this invention includes speed indicating means to permit the driver to determine his speed and to this extent the device may entirely replace the conventional speedometer. This portion of the mechanism is housed within the casing 10 and includes a flexible shaft (not shown) which is positioned within a flexible conduit 30 and which shaft rotates in accordance wtih the speed of movement of the car. The shaft terminates in a portion 31 having a small gear 32 keyed thereto, such gear driving a gear 33 rotating at right angles to the shaft 31, such latter gear being keyed to a shaft 35 journalled in a bearing 36 supported by a bracket 37.

A conventional rotor 39 is secured to the opposite end of the shaft 35. An aluminum cup 42 is mounted on a short shaft 43 which is journalled at one end thereof in a bracket 44. The opposite end of the shaft 43 is positioned within a centrally disposed aperture 46 in the rotor 39.

The speed indicating hand 16 is keyed to this short shaft and an arm 47 carrying a stylus or pen 48 for marking on the tape is secured to the aluminum cup 42. A conventional speed record line made on tape 26 by pen 48 is indicated at 49. An angular bracket 50 is secured at its lower end to the lower wall of the casing and on its first horizontal portion 51 supports a magnetic coil 52. The upper portion 53 of this bracket engages the rear surface of the closure plate 17 and also supports the journal bracket 44.

The shaft 43 carrying the indicators 16 and 47 is urged in the direction of "0" on the dial 15 by means of a hair spring positioned within a recess (not shown) in the bracket 44 and as the speed of rotation of the rotor 39 increases the cup moves against the spring, thus showing the speed by the indicating hand.

The removable frame or housing which supports the tape reels and the mechanism for actuating the same is shown by the reference numeral 57. This housing is preferably made from sheet metal and includes a front wall 58 having a rectangular opening 59 therein and side wall members 60 and 61 respectively, the latter wall being removable.

A lower door 64 of the casing 10 is hinged at 65 and at the front end is secured in closed position by means of a locking member 66 which may include a lock actuated by a key if desired. A recess 68 of suitable size is formed in the casing 10 to receive the housing 57 and at the forward end a recess 69 is formed to assure the front wall of the housing being properly positioned when it is inserted within the recess 68. The housing is further urged in the direction of this recess by means of a plurality of flat springs 71 secured to the interior surface of the rear wall 72 of the casing by means of screws 73. Also, in order to insure contact with the upper wall of the casing 10 the housing is urged upwardly by means of a flat spring 75 secured to the upper surface of the hinged door 64 by means of screws 76.

The tape 26 extends substantially the full width of the housing 57 and is provided with pre-punched sprocket holes 78 adjacent to each marginal edge thereof and with a plurality of spaced markings 79, each constituting an arc of the circle described by the pen or stylus 48. These curved markings are so arranged as to be spaced apart at the center thereof the distance the tape travels in fifteen minutes, and each marking is provided with transverse extensions 80 leading on one terminal to the date marking 25 and on the other terminal to the hour designation 28. There is thus formed a relatively large area over which the pen 48 may traverse during each fifteen minute period.

The starting roll 82 is wound on a reel 83 having end discs 84 and a shaft 85 passes through the center of this reel, such shaft being journalled in the side walls 60 and 61. A collar 87 at one end of the shaft retains the shaft 85 in its bearing in the wall 60 and when the reels are to be changed, the wall 61, which is a removable plate, is withdrawn from the housing.

The tape 26 from the roll 82 first passes over an elongated drum or pulley 89 mounted on a shaft 90 and passes over the front surface of a vertical supporting plate 92 having flange portions 93 and 94 at opposite ends thereof, the portion 93 being secured to the wall 60 by means of screws 95 and the flange portion 94 having a projection 96 which fits into a recess 97 in the wall 61. The upper and lower edges of the plate 92 are formed with diagonally disposed flanges 98 which are engaged by the tape as it enters upon and leaves the plate. The front surface of the plate 92 is desirably on the same plane as the front surface of the front wall 58, as shown in Fig. 4. In order to prevent the tape from unreeling too rapidly, a brake comprising a flat spring 102, mounted on a pin 103, engages the outer periphery of such roll.

Leaving the plate 92 the tape passes over an elongated pulley or drum 104, having driving sprockets 105 engaging the sprocket holes 78, such pulley being mounted on a shaft 106. This shaft projects through the wall 60 and is provided with a gear 109 on the exterior of the housing. This gear is driven by an idler 110 on a shaft 111, which in turn is driven by a gear 112 on a drive shaft 113. The shaft 113 is driven by a suitable spring driven block mechanism (not shown) which is positioned within a casing 115 secured to the housing 57 by means of angle brackets 116. The spring motor is wound by means of a crank 117 and the speed of the spring motor is such as to move the tape, by means of the driving sprockets, the distance between two arcuate lines 79 every fifteen minutes.

The tape 26, after leaving the pulley 104, passes over a final idler pulley 120 mounted on a shaft 121 and is thence wound on a rewind reel 124. This reel has a larger diameter than the reel 83 in order to accommodate in the center thereof a coil spring 125 which is mounted on a shaft 126. A collar 122 is mounted adjacent to one end of shaft 126 and is free to rotate thereon, although longitudinal movement of the collar relative to the shaft is prevented by means of a set screw 123 which passes into an annular recess (not shown) in the shaft 126. One end of the spring 125 passes through a small aperture 127 in this collar and is secured therein. The other end of spring 125 is secured to the shaft at 128. When the reel 124 is in the position shown in Fig. 5 the collar 122 is keyed thereto by means of an internal spline 129 which engages a recess 129' in the collar. It will be apparent that the actual driving of the tape is performed by the sprockets 105 and the only function of the spring 125 is to take up the slack tape. The spring 125 is wound in the following manner. A gear 130 is free to move longitudinally of the shaft 126, but rotative movement of the gear relative to the shaft is prevented by means of a key 131.

Figure 5:
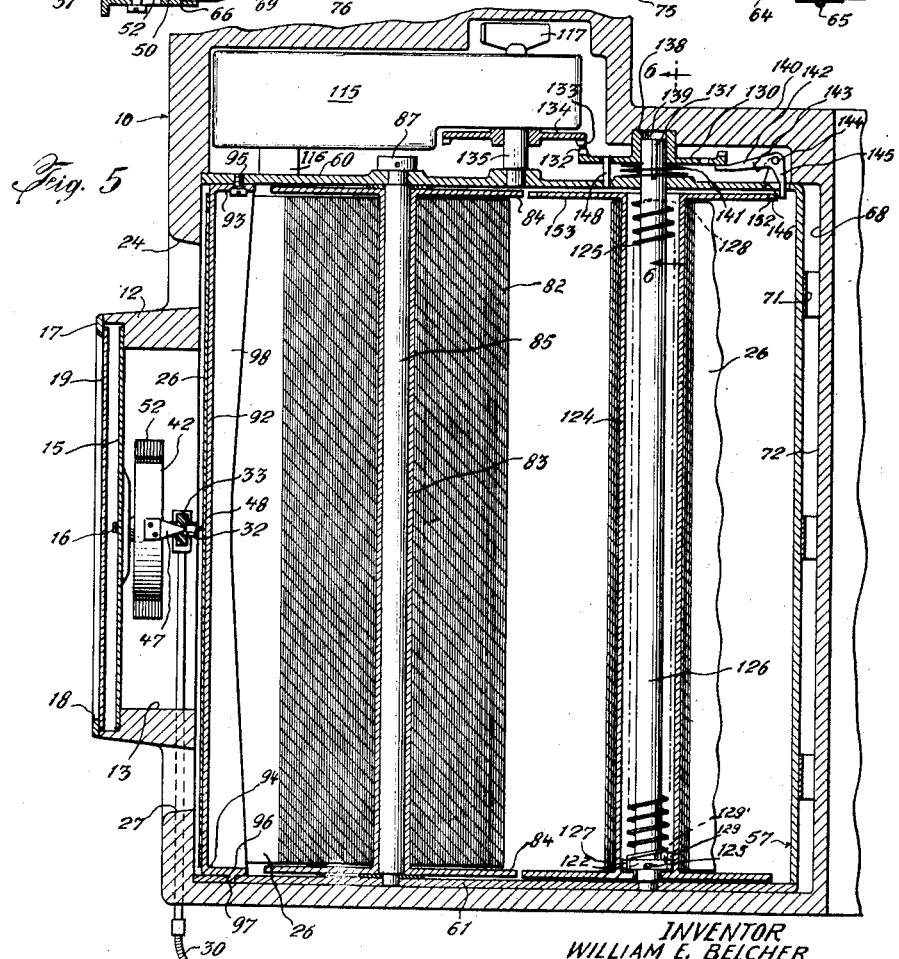
Fig. 5 is a broken horizontal section taken on line 5—5 of Fig. 4.

This gear is formed with teeth 132 on its external surface which are normally free from engagement with teeth 133 on a similar gear 134 mounted on a shaft 135 leading from the spring motor housing 115. The gear is formed with a collar 138 which, when the housing is in the casing, resides in a vertical recess 139 in the end wall 140 of the casing. A spring 141 carried on the shaft 126 urges the gear outwardly but when the collar 138 is in the recess 139, the gear is moved inwardly against the compression of the spring, as shown in Fig. 5. In this position the inner surface of the gear engages one arm 142 of a bell crank lever which is urged in a clockwise direction by means of a spring 143, the lever being pivotally mounted at 144.

The opposite arm 145 of the lever passes through a slot 146 in the housing wall 60. When the gear is held inwardly against the compression of the spring 141 by engagement with the end wall of the recess 139, it is held against rotative movement by means of a pin 148 which passes through one of a plurality of spaced apertures 149 in the gear. When, however, the housing is removed from the casing, the gear 130 moves outwardly to a point where the teeth of the gear engage the teeth 133 on the gear 134. This outward movement also permits the bell crank lever to move with the spring, and the arm 145 engages one of the teeth 152 around the periphery of the disc 153 carried at one end of the reel 124, thus preventing rotative movement of the latter.

The spring mechanism may now be wound by turning the crank 117 and as this is done the shaft 135 also causes gears 134 and 130 to revolve, thus winding the spring 125 a sufficient amount to give it enough energy to take up the slack in the tape between the drum 104 and the reel 124.

In starting the device into operation, the reel 83 and the reel 124 are withdrawn from the housing and the former reel is provided with a full winding of tape having the indicia previously described printed thereon for any given period. The reels are then moved into place and movement of the reel 124 causes the spline 129 to enter recess 129' in the collar 122. Thus the collar becomes keyed to the reel 124 and the tape may then be passed over the elongated pulley 89, over the plate 92, around the sprocket wheels 104, over the pulley 120 and is then secured to the winding reel 124. It is preferred to wind the clock at this point, inasmuch as when the reel 124 has been withdrawn to remove the previous winding of tape therefrom, the spring 125 becomes completely unwound. As previously stated, the winding of the clock also stores energy in the spring 125 and the reel 124 is now ready to take up the slack in the tape after the same leaves the sprocket wheels. The clock is then started in operation and the housing placed within the casing.

The device is now ready for use, and it will be apparent that while the car is standing still the marker 48 remains at "0". As the car begins to move, the marker moves in accordance with the speed of movement, thus recording the speed upon the tape. The following means are provided for adjusting the position of the tape in the event that the tape is running either too fast or too slow. The right hand end of the shaft 106, as viewed from the position shown in Fig. 2, is provided with a thumb turn gear 160 (shown in broken lines), and the gear 109 at the opposite end of shaft 106, while relatively firmly secured thereto by frictional means, is nevertheless sufficiently loosely mounted so that when the shaft 106 is manually rotated by the thumb turn gear 160, the gear 109 remains stationary and the shaft 106, carrying the sprocket wheeels 105, revolves. In the event that the tape must be moved forward, such revolution of the shaft 106 causes the tape to so move and the slack is immediately taken up on the rewind reel 124. In the event that the tape is ahead, the shaft is turned in the opposite direction and the slack is taken up by manually turning the reel 83.

It will be apparent that this embodiment of the invention is illustrative only, and is capable of many modifications without departing from the spirit of the invention.

What I claim is:

In a speed-recording device having a movable tape which is fed from a supply roll to a rewind reel by means of a spring motor, the combination of means for imparting rotation to the rewind reel for removing slack in the tape, said means comprising a shaft upon which the rewind reel is journalled, a coil spring carried concentrically of the shaft and being connected at one end thereof to said reel and at the other end to the shaft, a longitudinally movable gear keyed to the shaft, the gear being normally unconnected with said spring motor, means comprising a spring for urging the gear into operative connection with the spring motor to wind the coil spring, and means for preventing rotation of the reel while the spring connected therewith is being wound.

WILLIAM E. BELCHER.